United States Patent [19]

Lee et al.

[11] Patent Number: 5,653,110
[45] Date of Patent: Aug. 5, 1997

[54] FILM COOLING OF JET ENGINE COMPONENTS

[75] Inventors: Ching-Pang Lee, Cincinnati, Ohio; Nesim Abuaf, Schenectady, N.Y.; Paul Stuart Wilson, Fairfield, Ohio

[73] Assignee: General Electric Company, Cincinnati, Ohio

[21] Appl. No.: 733,892

[22] Filed: Jul. 22, 1991

[51] Int. Cl.⁶ .................... F02C 1/00; B63H 1/14
[52] U.S. Cl. .................... 60/756; 60/757; 416/95
[58] Field of Search .................... 60/266, 752, 755, 60/756, 757; 416/95, 96 R, 97 R

[56] References Cited

U.S. PATENT DOCUMENTS

| | | | |
|---|---|---|---|
| 2,617,255 | 11/1952 | Niehus | 60/757 |
| 3,515,499 | 6/1970 | Beer et al. | 416/95 |
| 3,542,486 | 11/1970 | Kercher et al. | 416/90 |
| 3,584,972 | 6/1971 | Bratkovich et al. | 416/229 |
| 4,280,792 | 7/1981 | Hartel et al. | 415/117 |
| 4,446,693 | 5/1984 | Pidcock et al. | 60/757 |
| 4,650,138 | 3/1987 | Grose | 244/130 |
| 4,903,480 | 2/1990 | Lee et al. | 60/270.1 |
| 4,930,729 | 6/1990 | Savill | 244/200 |
| 5,483,794 | 1/1996 | Nicoll et al. | 60/261 |
| 5,557,932 | 9/1996 | Nash | 60/266 |

FOREIGN PATENT DOCUMENTS 1060095 2/1967 United Kingdom ............ 60/757
2074308 10/1981 United Kingdom ............ 60/752

OTHER PUBLICATIONS

M.C. Gillcrist and L.W. Reidy, AIAA/ASME/SAE/ASEE, 25th Joint Propulsion Conference, Monterey, CA, Jul. 10–12, 1989, "Drag Measurements on Marine Vehicles With a Riblet Surface Coating".

Michael J. Walsh, William L. Sellers III, and Catherine B. McGinley, AIAA 6th Applied Aerodynamics Conference, Williamsburg, VA, Jun. 6–8, 1988, "Riblet Drag Reduction at Flight Conditions".

Primary Examiner—Richard A. Bertsch
Assistant Examiner—Howard R. Richman
Attorney, Agent, or Firm—Andrew C. Hess; Patrick R. Scanlon

[57] ABSTRACT

A jet engine component, such as an aircraft gas turbine engine rotor blade or a scramjet engine fuel injector. The component has a wall portion including a first surface exposable to a cooler, higher static pressure fluid and a second surface exposable to a hotter, lower static pressure gas flow flowing across the second surface. The component further includes a generally straight film coolant passageway having an inlet on the first surface and an outlet on the second surface. The second surface has a seamless groove which is open substantially entirely along its longitudinal dimension extending from the outlet along the lower static pressure gas flow for improved film cooling of the second surface.

9 Claims, 3 Drawing Sheets

FILM COOLING OF JET ENGINE COMPONENTS

CROSS-REFERENCE TO RELATED APPLICATIONS

Reference is hereby made to the following copending application dealing with related subject matter and assigned to the assignee of the present invention: "Gas Turbine Engine Multi-Hole Film Cooled Combustor Liner and Method of Manufacture", by Thomas G. Wakeman et al., filed Nov. 15, 1990, and assigned U.S. Ser. No. 07/614,418, now U.S. Pat. No. 5,181,379.

BACKGROUND OF THE INVENTION

The present invention relates generally to cooling of jet engine components having a surface exposed to a hot gas flow, and more particularly to film cooling of such components. The phrase "jet engine" includes gas turbine, ramjet, and scramjet engines. Such jet engines may be used to power flight vehicles, and the gas turbine engine type of jet engine may also be used to power ships, tanks, electric power generators, pipeline pumping apparatus, etc. For purposes of illustration, the invention will be described with respect to film cooling of an aircraft gas turbine engine component using cooling air. However, it is understood that the invention is equally applicable to film cooling of other types of jet engines (such as scramjets) and/or to film cooling using other cooling fluids (such as liquid fuel).

A gas turbine engine includes a core engine having a high pressure compressor to compress the air flow entering the core engine, a combustor in which a mixture of fuel and the compressed air is burned to generate a hot propulsive gas flow, and a high pressure turbine which is rotated by the propulsive gas flow and which is connected by a shaft to drive the high pressure compressor. Engine thrust comes from the core engine airflow after it flows through the high pressure compressor to the combustor and is expanded past the high pressure turbine and out the exhaust nozzle. A gas turbine engine, such as an aircraft turbofan jet engine, may include other components, such as a thrust producing fan, a low pressure compressor, and a low pressure turbine.

Certain components of gas turbine engines, such as high pressure turbine rotor blades and combustor casing (or liner) walls, are subjected to hot combustion gases. Current engine designs require that such components be cooled to keep their temperatures within design limits. A known technique for cooling gas turbine engine components is film cooling of a component wall surface which is exposed to a hotter, lower static pressure gas flow. In this technique, another wall surface of the component is exposed to cooler, higher static pressure air, and a passageway is provided between the two surfaces. A cooling, thermally protective film of air thus flows out of the passageway and along the hotter surface. As future engine designs call for hotter operating temperatures, techniques are needed to improve film cooling effectiveness.

SUMMARY OF THE INVENTION

It is an object of the invention to provide improved film cooling of jet engine components.

The invention provides a jet engine component having a wall portion which includes a first surface exposable in an operating jet engine to a cooler, higher static pressure fluid and a second surface exposable in the jet engine to a hotter, lower static pressure gas flow flowing generally across the second surface. The wall portion further includes a generally straight film coolant passageway having an inlet positioned on the first surface and having an outlet positioned on the second surface. The second surface has a seamless groove which is open substantially entirely along its longitudinal dimension extending from the outlet along the lower static pressure gas flow.

The benefit and advantage derived from the jet engine component of the invention are improved film cooling of the hotter surface of the wall portion of the component because the groove suppresses mixing between the cooling film and the hotter gas flow to allow the cooling film to stay attached to the second surface for a longer distance.

BRIEF DESCRIPTION OF THE DRAWINGS

The accompanying drawings illustrate a preferred embodiment of the present invention wherein.

DETAILED DESCRIPTION OF THE INVENTION

Figure 1:
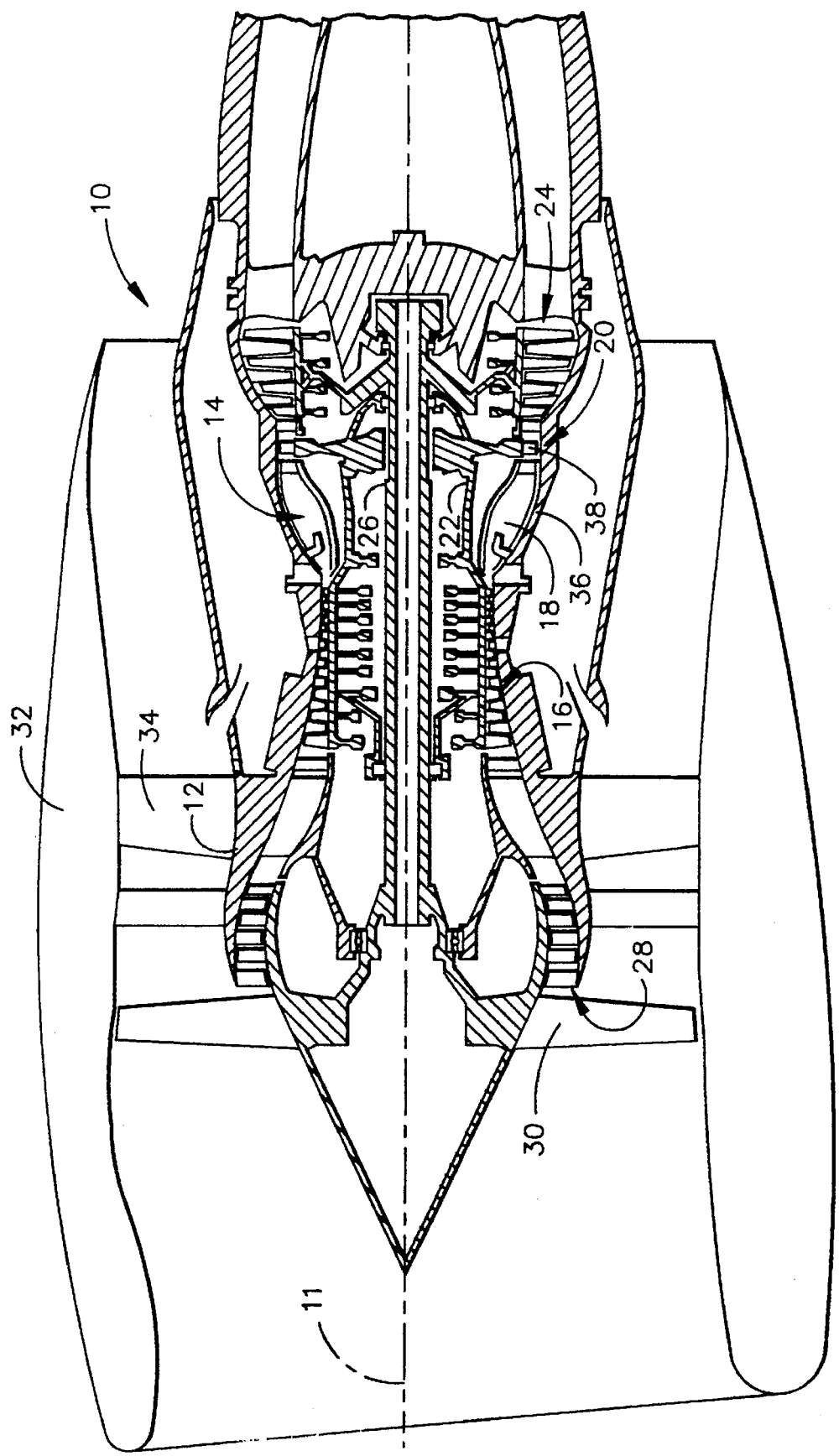
FIG. 1 is a schematic side view of a front fan gas turbine engine in which the improved film cooling of the invention may be employed.

Referring now to the drawings, and particularly to FIG. 1, there is illustrated generally a jet aircraft front fan gas turbine engine, generally designated 10, which includes a preferred embodiment of the invention as hereinafter described. The turbofan jet engine 10 has a longitudinal centerline or axis 11 and an annular casing 12 disposed coaxially and concentrically about the axis 11. The turbofan jet engine 10 includes a core engine (also called a gas generator) 14 which is comprised of a high pressure compressor 16, a combustor 18, and a high pressure turbine 20, all arranged coaxially about the longitudinal axis 11 of the turbofan engine 10 in a serial, axial flow relationship. An annular drive shaft 22 fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure or power turbine 24. The low pressure turbine 24 turns a drive shaft 26 which drives an interconnected low pressure compressor (also called booster or booster compressor) 28 and fan blades 30. Various engine bearings support the rotating shafts 22 and 26 within the engine casing 12. The fan blades 30 are housed within a fan nacelle 32 which is attached to the engine casing 12 by a plurality of hollow fan struts 34, only two of which are shown in FIG. 1.

Figure 2:
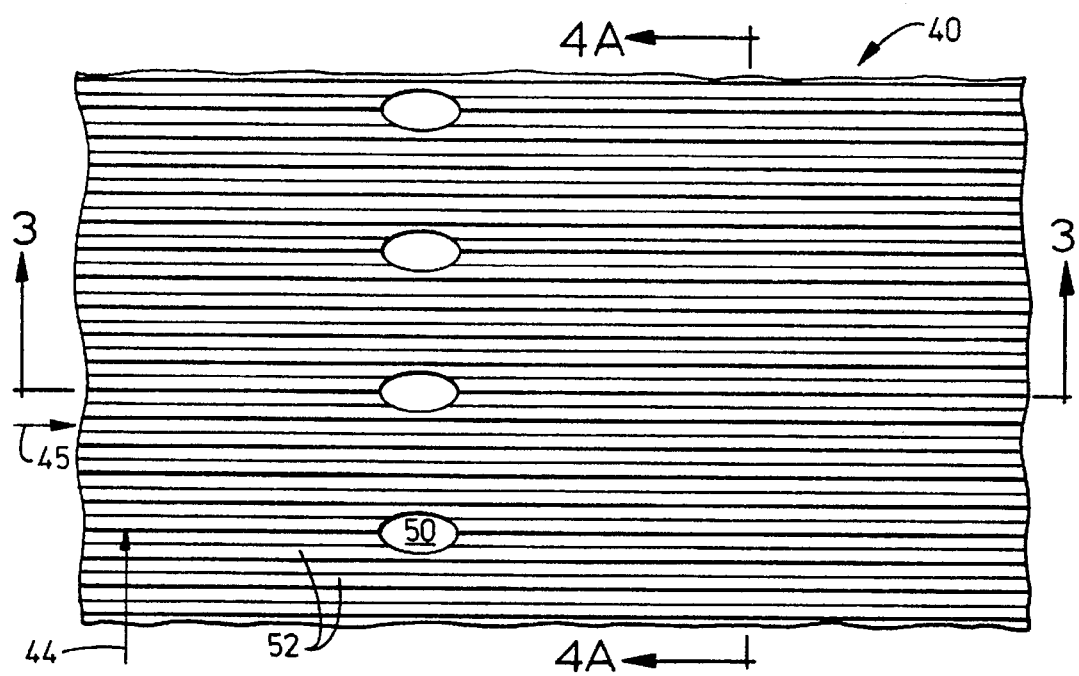
FIG. 2 is a top view of a portion of the wall of a component (such as the outside surface of the wall of a turbine rotor blade or the inside surface of the wall of a combustor casing or liner) of the engine of FIG. 1 utilizing the improved film cooling of the invention.
Figure 3:
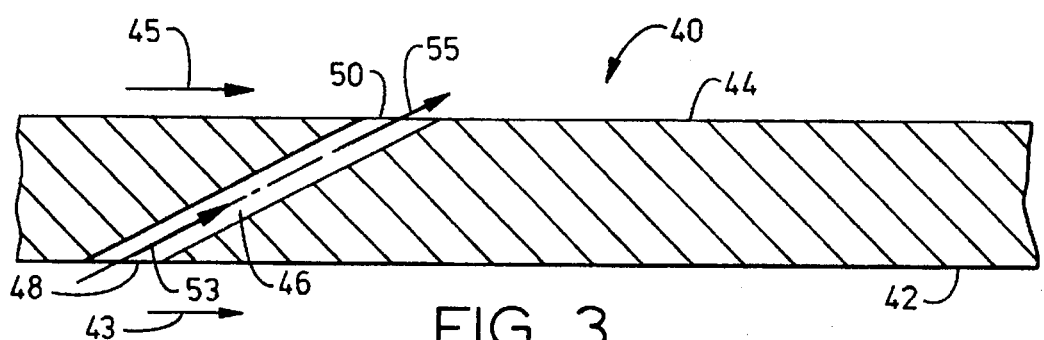
FIG. 3 is a cross sectional view taken along lines 3—3 in FIG. 2.

Certain components of the gas turbine engine 10 have surfaces which are exposed to hot combustion gases, such as (but not limited to) the inside surface of the casing 36 or the liner of the combustor 18, the outside surface of the rotor blades 38 of the high pressure turbine 20, and the exhaust nozzle. Referring to FIGS. 2 and 3, a wall portion 40 of a gas turbine engine component (such as a high pressure turbine rotor blade 38 or a combustor casing 36) includes a first surface 42 and a second surface 44. The first surface 42 is exposable in an operating gas turbine engine 10 to cooler, higher static pressure air 43. Such air 43 could be conventionally taken (not shown) from the high pressure compressor 16, as is known to those skilled in the art of aircraft engine component film cooling techniques and as is disclosed in U.S. Pat. No. 3,542,486 for film cooling of a turbine rotor blade. The second surface 44 is exposable in the operating engine 10 to a hotter, lower static pressure gas flow 45 which flows generally across the second surface 44. The gas flow 45 is made up of combustion gases and may also be referred to as a propulsive gas flow.

The wall portion 40 further includes a film coolant passageway 46 having an inlet 48 disposed on the first surface 42 and having an outlet 50 disposed on the second surface 44. The second surface 44 has a seamless groove 52 (and preferably a plurality of open grooves 52) which is open substantially entirely along its longitudinal dimension extending from the outlet 50 along the lower static pressure gas flow 45. The grooves (also known as riblets) 52 can extend upstream from the outlet 50 as well as downstream, where "downstream" means along the gas flow.

The passageway 46 contains passageway air 53 which is that portion of the cooler, higher static pressure air 43 which has entered the inlet 48 of the passageway 46 and which will exit the outlet 50. In an exemplary embodiment, the passageway 46 is disposed such that passageway air 53 exiting the outlet 50 will have a velocity vector 55 that lies in a plane which is generally perpendicular to the second surface 44 at the outlet 50 and which extends generally from the outlet 50 along the groove or grooves 52. Stated in the negative, such velocity vector 55 would not have a surface component which is transverse to the groove or grooves 52. Thus, such passageway air 53 can exit the outlet 50 either straight out from the second surface 44, straight along the surface 44 in the direction of the groove or grooves 52, or anywhere in between. Stated more precisely, the passageway 46 is disposed such that its longitudinal axis lies in a plane which is generally perpendicular to the second surface 44 at the outlet 50 and which extends generally from the outlet 50 along the groove or grooves 52.

Figure 4A:
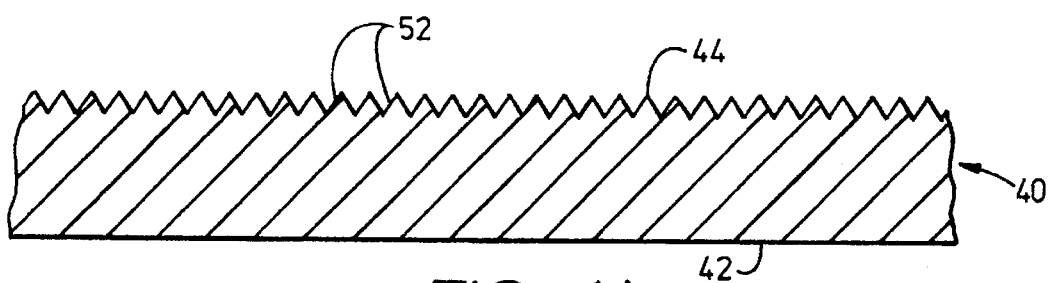
FIGS. 4A, 4B, and 4C are cross sectional views taken along lines 4—4 in FIG. 2 with each view showing a different shape groove associated with the improved film cooling of the invention.
Figure 4B:
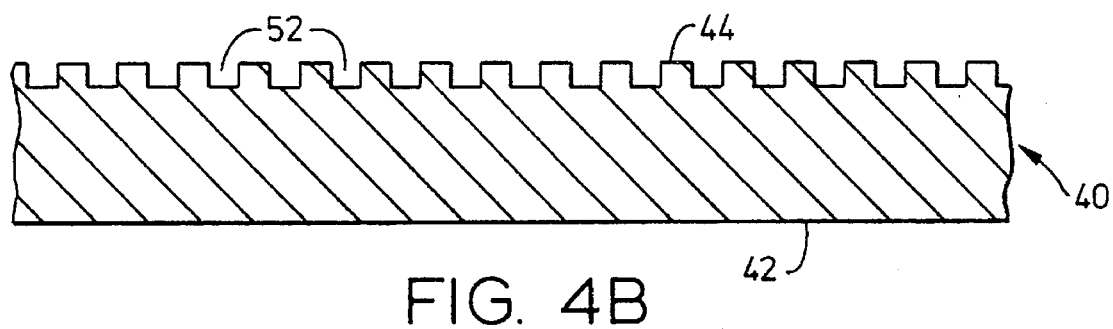
Figure 4C:
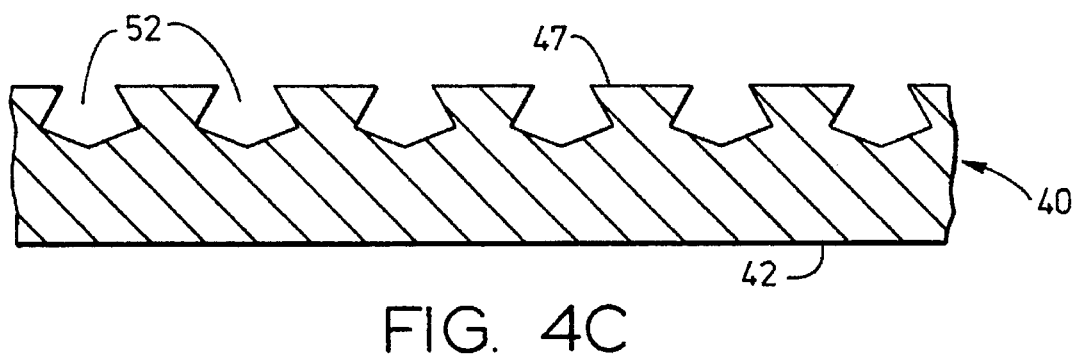

Preferably, the passageway 46 is a generally straight passageway, the second surface 44 is generally planar, and each groove 52 is a generally straight groove. The outlet 50 is normally positioned downstream of the inlet 48, with downstream being defined by the direction of flow of the hotter, lower static pressure gas flow 45, and a typical passageway 46 would form a generally forty-five degree angle with the direction of such gas flow 45. The groove or grooves 52 may have any shape such as a "V" shape, a "U" shape, or a dovetail shape, as seen from FIGS. 4A, 4B, and 4C. The dovetail shape may better retain the cooling film in the groove.

It is desirable that each groove have a width which is equal to, or preferably narrower than, the corresponding dimension of its associated outlet (e.g., the width of the grooves 52 in FIG. 2 are narrower than the minor axis of the elliptical outlet 50 of the tilted circular cylindrical passageway 46). Choice of groove size depends on predetermined local flow conditions. A preferred groove 52 added to a conventional film cooled high pressure turbine rotor blade or combustor casing (or liner) would have a width and depth on the order of one-half thousandths to several thousandths of an inch, and there could be two (or more) such grooves associated with each film coolant passageway outlet. The grooves could be laser etched and could extend downstream a suitable distance to derive maximum film cooling benefit, as can be determined by the artisan. A preferred surface 44 can be described as a micro-grooved surface.

The grooves 52 are thought to improve film coolant effectiveness by suppressing turbulent mixing inside the cooling film boundary layer. During engine operation, the cooling film flow near the grooves is entrained along the groove orientation. The flow mixing in the direction perpendicular to the groove direction is then suppressed. As can be appreciated by those skilled in the art, the grooves suppress mixing between the cooling film and the hotter gas flow, thereby allowing the cooling film to stay attached to the hot surface for a longer distance to maintain a higher film cooling effectiveness.

The invention may also be used in other jet engines, such as in improving the effectiveness of the film cooling of the scramjet fuel injector disclosed in U.S. Pat. No. 4,903,480 wherein liquid fuel is used to film cool the outer wall surface of the injector against a hot, compressed hypersonic airflow. It is noted that the cooling liquid fuel of the scramjet engine and the cooling air of the previously described gas turbine engine may be described in general terms as an available cooling fluid in a jet engine. It is also noted that the hot gas flow of the jet engine is air for a scramjet engine and combustion gases for a gas turbine engine.

The foregoing description of a preferred embodiment of the invention has been presented for purposes of illustration. It is not intended to be exhaustive or to limit the invention to the precise form disclosed, and obviously many modifications and variations are possible in light of the above teachings, all of which are within the scope of the claims appended hereto.

We claim:

1. A jet engine component comprising a wall portion including: a first surface exposable in an operating jet engine to a cooler, higher static pressure fluid; a second surface exposable in said operating jet engine to a hotter, lower static pressure gas flow flowing generally across said second surface; and a generally straight film coolant passageway having an inlet disposed on said first surface and having an outlet disposed on said second surface and wherein said second surface has a seamless groove which is open substantially entirely along its longitudinal dimension extending from said outlet along said lower static pressure gas flow.

2. The component of claim 1, wherein said passageway is disposed such that its longitudinal axis lies in a plane which is generally perpendicular to said second surface at said outlet and which extends generally from said outlet along said groove.

3. The component of claim 2, wherein said second surface is generally planar and said groove is a generally straight groove.

4. The component of claim 3, wherein a plurality of said grooves extend from said outlet along said gas lower static pressure flow.

5. The component of claim 1, wherein said groove has a generally "V" shape.

6. The component of claim 1, wherein said groove has a generally "U" shape.

7. The component of claim 1, wherein said groove has a generally dovetail shape.

8. The component of claim 1, wherein said wall portion is a wall portion of a high pressure turbine rotor blade of a gas turbine engine and said fluid is air.

9. The component of claim 1, wherein said wall portion is a wall portion of a combustor casing of a gas turbine engine and said fluid is air.

* * * * *